Patented July 7, 1931

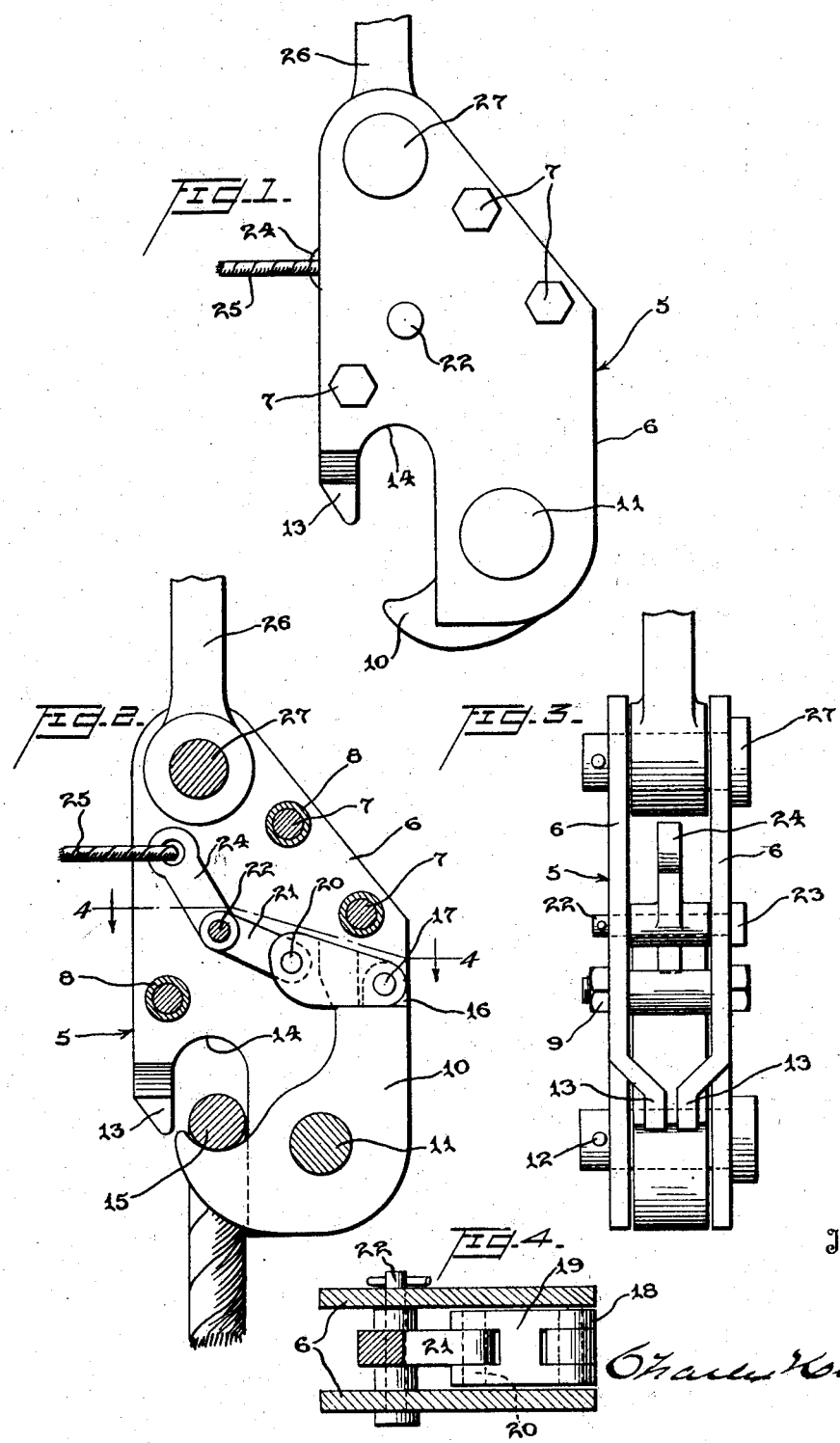

1,813,294

UNITED STATES PATENT OFFICE

CHARLES HUNT, OF WASHINGTON, DISTRICT OF COLUMBIA

CRANE HOOK

Application filed May 7, 1929, Serial No. 361,017. Renewed November 20, 1930.

This invention relates to improvements in hooks, and more especially to hooks of the type employed with devices for lifting heavy loads.

The primary object of the invention is to provide a rugged hook of the releasable type, and one in which the load will cause locking of the hook in its secured position.

A further object is to furnish a hook of this character, in which the hook proper may be readily released when the hook is relieved of the load.

A further object is to provide such a hook having detachably connected elements which may be readily separated from each other when desired, for the purpose of dismantling the same. This feature facilitates manufacture.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a side elevation of my improved hook with the hook proper in open position.

Fig. 2 is a longitudinal vertical sectional view of the same, with the hook proper in closed position, and illustrating the manner in which the hook proper acts to secure itself in supporting position when it is carrying a load.

Fig. 3 is an edge view of the device.

Fig. 4 is a transverse sectional view on the line 4—4 of Fig. 2.

In the drawings, the device in its entirety is designated 5, and it is comprised of a pair of side or face plates 6, which are joined together by pins 7, and are spaced apart by sleeves 8 which surround the pins and impinge at their ends against the inner faces of the side plates. Each of the pins is preferably in the form of a bolt provided with a nut 9 to facilitate dismantling and assembling.

The hook proper is designated 10, and it is pivotally mounted on a pin 11 which extends through the side plates, and is provided with a removable pin 12 to allow detachment of the member 10 from the side plates when desired.

The side plates have inwardly extending lugs 13 which form an abutment or nose at the front of a slot 14 to prevent a rope, cable, shackle or the like 15 from slipping off the end of the member 10 when the latter is in the locked position shown in Fig. 2.

For the purpose of latching the hook and for releasing the same when desired, the upper end of the member 10 is provided with an upstanding apertured ear 16 which is joined by a pivot pin 17 to one of the fork shaped ends 18 of a toggle link 19. The opposite end of this link is connected by a pivot pin 20 to one end of a second toggle link 21, which has its opposite end fixed to a rock shaft 22. This shaft is preferably in the form of a detachable pin 23 which extends through the side plates, and is actuated by an arm 24 that is fixed to the link 21, and may be operated by any suitable means such as a release rope 25.

When the device is in the latched position shown in Fig. 2, it will be noted that the axis of the pivot 20 is below a line passing through the axes of the pivots 17 and 22, and consequently, any load acting to swing the member 10 in a counter clock-wise direction in Fig. 2, will function to more effectively secure the member 10 in the position shown in Fig. 2. Consequently, the greater the load supported by the member 10, the larger will be the locking effect.

On the other hand, when the member 10 is relieved of the load, the operator, by pulling on the release cord 25, and thus swinging the pivot 20 upwardly, will break the toggle effect and permit automatic releasing of the member 10 when the device is pulled away from the load support 15.

Of course, the device may be raised and lowered by any suitable means, such as a crane or the like, which will be operatively connected to a shackle 26 that extends into the space between the upper ends of the side plates and is secured in position by a detachable pin 27.

In operation, let us assume that the hook is open as shown in Fig. 1. Now if the load support 15 is inserted into the slot 14, and the rope 25 released, the parts, due to their arrangement and weight, will automatically assume the position shown in Fig. 2. Now if the device is elevated, the load bearing on the member 10 will tend to swing the hook in a clockwise direction, so that the toggle links 19 and 21 will positively prevent the member 10 from moving to the open position.

When the device is to be released, the load is permitted to come to rest on a suitable support, and then, as the member 10 is relieved of its burden it may be readily swung to open position by simply pulling on the release cord 25.

The terms and expressions employed herein are used as terms of description and not of limitation, and there is no intention in the use of such terms and expressions, of excluding any mechanical equivalents of the features shown and described, or portions thereof, but it is recognized that various structural modifications are possible within the scope of the invention claimed.

What I claim and desire to secure by Letters Patent is:

1. A hook device including a frame formed of a plurality of plates, a hook member movably supported by the frame, and means including toggle links for holding the hook member in latched position, said toggle links having a pivotal connection with the hook member.

2. A hook device including a frame formed of a plurality of plates, a hook member pivotally mounted in the frame, and latching means for the hook member comprising toggle links, said toggle links being pivotally connected with the hook member.

3. A hook device including a frame formed of a plurality of plates, a pivotally mounted hook member carried by the frame, and means pivotally connected to said hook member for holding the same in latched position, said means tending to secure the hook member to an increased extent as the load supported by the hook member is increased.

4. A hook device including a frame formed of a plurality of plates, a pivotally mounted hook member carried by the frame, and combined release means and latching means for holding the hook member in latched position, said means being pivotally connected to the hook member and functioning to latch the hook member to an increased degree as the load on the hook member is increased.

5. A hook device including a frame formed of a plurality of plates, a hook member pivotally mounted in the frame, toggle links for holding the hook member in latched position, one of said links being pivotally connected to the hook member, and another one being pivotally connected to the frame, and means for swinging one of said links about its pivot axis.

6. A hook device including a frame formed of detachably connected spaced side plates, a hook member arranged between the plates and pivotally connected to said plates, toggle links arranged between the plates, one of said links being pivotally connected to the hook member, and another one of the toggle links being pivotally connected to said plates, and means for swinging one of said toggle links about its pivot axis.

7. A hook device including side plates, means for spacing said plates apart, means connecting the plates, a hook member pivotally connected to the plates and arranged between the same, toggle links, one of said toggle links being pivotally connected to the hook member, and another one of the toggle links being pivotally connected to the plates, and means for swinging the last mentioned toggle link about its pivot axis.

8. A hook device including a frame formed of spaced connected side plates, a hook member pivotally connected to the plates and arranged between the same, pivotally connected toggle links, one of said toggle links being pivotally connected to the hook member and another one of the toggle links being pivotally connected to the frame, and means for swinging one of the toggle links about its pivot axis.

9. A hook device comprising side plates having registering slots and lugs arranged adjacent to said slots and extending toward each other, means securing the side plates together, a hook member pivotally connected to the plates, arranged between the latter, and having a portion adapted to move into a position between said slots, pivotally connected toggle links arranged between the plates, one of said toggle links being pivotally connected to the hook member, and the other toggle link being pivotally connected to said plates, an arm united with the last mentioned toggle link, and means for actuating said arm.

10. A hook device including a frame, a hook member, a bell crank, and a link, one end of said link being pivoted to said bell crank, the opposite end thereof being pivoted to an end of the hook member, said hook member being pivoted to the frame of the hook device.

11. A hook device comprising a frame formed of a plurality of plates, a hook member and bell crank pivotally mounted between the plates, and a link, one end of said link being pivotally secured to the bell crank, the opposite end thereof being pivoted to the hook member, said hook member being pivoted to said plates.

12. A hook device including a frame formed of a plurality of plates, a hook member and a bell crank arranged therebetween and pivotally mounted thereon, and a link, one end thereof being pivoted to said bell crank the other end thereof being pivoted to said hook member, said hook member being pivoted to the side plates, and said bell crank adapted to be actuated so as to swing said link about its pivot axis.

CHARLES HUNT.